United States Patent [19]

Hyde

[11] Patent Number: 4,687,123
[45] Date of Patent: Aug. 18, 1987

[54] LIQUID DISPENSING TAP

[75] Inventor: Roger J. Hyde, Kettering, England

[73] Assignee: Alumasc Limited, Kettering, England

[21] Appl. No.: 667,995

[22] Filed: Nov. 5, 1984

[30] Foreign Application Priority Data

Nov. 8, 1983 [GB] United Kingdom ................. 8329810
Dec. 1, 1983 [GB] United Kingdom ................. 8332166

[51] Int. Cl.⁴ ............................................. B67D 3/00
[52] U.S. Cl. .................................. 222/518; 222/559;
277/174
[58] Field of Search ............... 222/511, 518, 501, 513,
222/472, 473, 474, 512, 83, 83.5, 544, 559, 389;
251/320, 322; 277/173–175, 177

[56] References Cited

U.S. PATENT DOCUMENTS

| 1,560,307 | 11/1925 | Peeler | 277/174 |
| 3,151,787 | 10/1964 | Miller | 222/518 |
| 3,187,965 | 6/1965 | Bourget | 222/518 |
| 3,362,589 | 1/1968 | Kinnavy et al. | 222/389 |
| 3,651,990 | 3/1972 | Cernei | 222/94 |
| 4,440,316 | 4/1984 | Christine | 222/518 X |

FOREIGN PATENT DOCUMENTS

| 704168 | 5/1931 | France | 222/518 |
| 94590 | 8/1949 | New Zealand | 222/549 |
| 2082152 | 3/1982 | United Kingdom . | |
| 2096284 | 10/1982 | United Kingdom . | |
| 2101275 | 1/1983 | United Kingdom . | |

Primary Examiner—Joseph J. Rolla
Assistant Examiner—Michael S. Huppert
Attorney, Agent, or Firm—William R. Hinds

[57] ABSTRACT

A liquid dispensing tap for dispensing liquid from a vessel. The tap has a body adapted to fit an outlet from the vessel. The body has a dispensing mouth and a seat for a valve housed in the body. The valve comprises a valve head and stem and is spring-loaded to close against the seat and manually displaceable to open. The stem extends downstream of the seat and passes as a sliding seal fit through a guide in the body wall. A closing spring, outside the path of the dispensed liquid, is formed integrally with the body and is engaged with the outer end of the valve stem.

11 Claims, 4 Drawing Figures

LIQUID DISPENSING TAP

This invention relates to taps for dispensing liquid from a vessel, in particular it is related to the type of tap used in conjunction with containers for beverages e.g. wine.

A disadvantage of known taps for such a use is that, due to their sealing operation, they are only capable of dispensing "still" beverages from containers of the 'bag in a box' type.

The present invention aims to eliminate this drawback by providing a tap of simple construction but allowing carbonated beverages to be dispensed under a small pressure.

The invention provides a tap, for dispensing liquid from a vessel, having a body to fit an outlet from the vessel, the body having a dispensing mouth and housing a valve, comprising a valve head and stem, spring-loaded to close downstream against a seat in the body and manually displaceable to open upstream, the stem extending downstream of the seat and passing as a sliding seal fit through a guide in the wall of the body to be engaged, outside the path of flow of dispensed liquid, by a closing spring formed integrally with the body.

In accordance with the invention, the tap body is moulded from plastics material, the spring is a resilient arm projecting from the body, and engaged under stress with the valve stem, and the arm has an elbow forming a resilient hinge between the body and a free end of the arm engaged with the valve stem.

For reliable operation of the tap, a lightly loaded but effected seal and guide of the valve stem in the body is important. Consequently, another feature of the invention is the provision of a seal, to prevent leakage of liquid along the valve stem, comprising two or more grooves around the stem defining one or more vanes formed integrally with the stem and lying between adjacent grooves, each vane projecting outwardly from the stem to seal against the guide and being sufficiently thin to flex and allow sliding movement of the stem in the guide, the resilience of the vane tending to maintain the seal. Advantageously the grooved part of the valve stem is thickened.

The invention will be further described wtih reference, by way of example, to the drawings in which.

Figure 1:
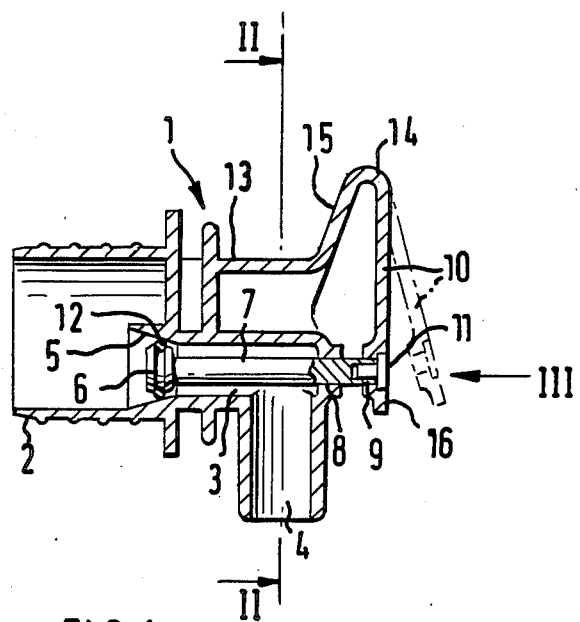
FIG. 1 is an axial sectional view of a tap in accordance with the invention.

The tap comprises a body 1 moulded of plastics material and having a tubular spigot 2 to fit the standard outlet of a "bag in a box" type container for wine or the like. A tubular duct 3 of reduced bore leads from the spigot 2 to a dispensing mouth 4 of the tap. The duct 3 has a tapered inlet to form a valve seat 5.

Housed in the duct is a plunger valve comprising a head 6 and stem 7, the head 6 being spring-loaded to close downstream against the seat 5 and being manually displaceable upstream to open the valve (as described below). The stem 7 extends downstream of the valve seat 5 and passes through the wall of the body 1 by a hole 8 which acts as a sliding seal against the stem 7 and as a guide for the plunger valve. The stem 7 is engaged at its foot 9 by the free end of a resilient arm 10 secured by a plug 11. The arm 10 is integrally moulded with the body 1 and forms a spring to urge the head 6 downstream into positive sealing contact with the valve seat 5 through a simple O-ring 12 carried by the head 6.

The arm 10 projects as an integral extension from the cross-flange of a T-flanged shoulder 13 on the body 1; the flange providing a strong structure with economy of material.

The arm 10 has an elbow at 14 forming a resilient hinge, the dotted lines in FIG. 1 showing the unstressed position of the arm 10 as moulded. When engaged wtih the valve foot 9, the arm 10 is under stress, due to the resilience of its material, and thus forms a spring.

Manual pressure, in the direction shown by the arrow III in FIG. 1, on the end of the valve stem 7 moves the valve upstream, against the pressure of liquid and the spring-loading of the arm 10, so as to open the valve. Such manual pressure may be conveniently exerted by placing the thumb on the end of the arm 10 in line with the stem 7 and placing the first and/or second finger at 15 behind the elbow 14; this helps to steady the tap on applying pressure with the thumb.

That part of the arm 10 in line with the stem 7 may conveniently be enlarged to provide a thumb button 16.

It can be seen that a strong and simple structure, assisting manual operation, is provided by the arm being an integral extension from the cross-flange of the T-flanged shoulder 13 on the body, that part 15 of the arm, extending laterally of the body from the flange to the elbow 14, providing a counter-surface, for engagement by fingers of a user's hand, facilitating manual depression of the free end of the arm engaged with the valve stem.

The dimensional tolerances for the tap have to be particularly exact to provide a seal at the hole 8 where the stem 7 passes through the wall of the body 1. If the tap is not made to such close tolerances, leakage of fluid along the stem 7 and through the hole 8 may occur especially when dispensing carbonated beverages.

Figure 4:
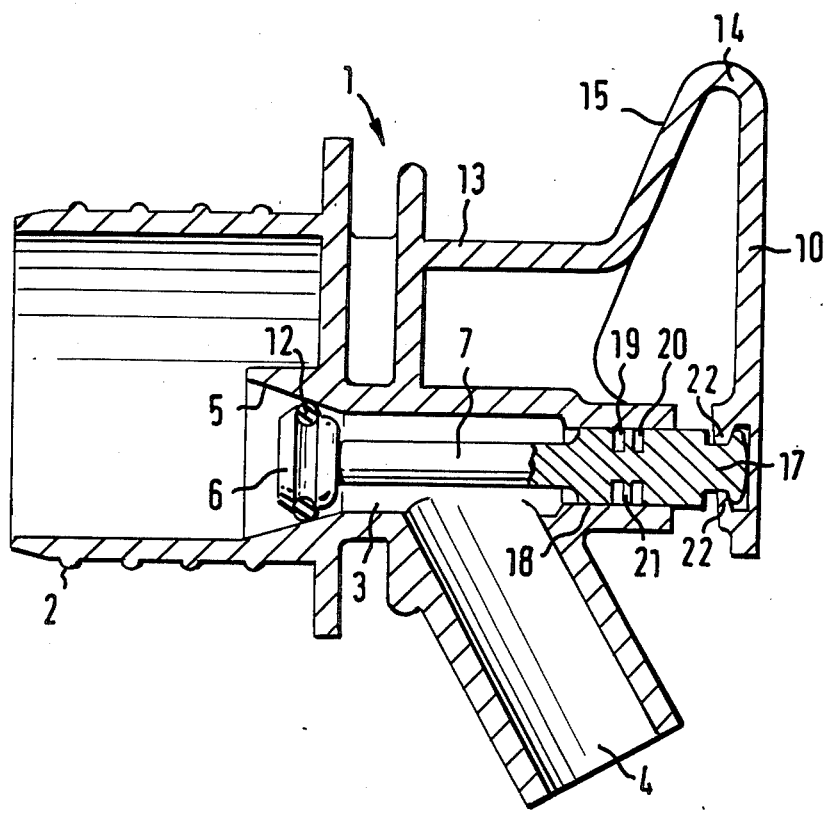
FIG. 4 is a larger scale axial sectional view of a second tap in accordance with the invention.

The tap of FIG. 4 incorporates an improved seal in accordance with another aspect of the invention. In FIG. 4 like parts are numbered as in FIG. 1. The seal is formed in a thickened part 17 of the stem which passes through and is a sliding fit in an elongated bore 18. Around the thickened part, the stem has a pair of grooves 19, 20 which define a vane 21 which is of slightly greater diameter so that it extends outwardly beyond the thickened part of the stem to make a seal against the bore 18.

The vane 21 is sufficiently thin to flex so as to allow sliding movement of the stem in the bore, the resilience of the vane 21 tending to maintain the seal.

A tap made in accordance with the drawing of FIG. 4 could have as the dimensions of stem, vane and bore:
  Outer diameter of stem 6.5 mm
  Outer diameter of vane 6.6–6.62 mm
  Bore diameter 6.55 mm
  Thickness of vane 0.2–0.25 mm This gives an interference fit between vane and bore of 0.05–0.07 mm.

The tap body can be made of any suitable material with sufficient resilience for the spring arm 10 to work. Similarly the valve stem can be made of any suitable material with sufficient resilience to allow the vane 21 to flex yet maintain a seal. Examples of suitable materials are polypropylene, high density polyethylene and acetyl resin.

It will be noted that the tap of FIG. 4 incorporates a spout, leading from the duct to the mouth 4, at an angle to the vertical. This is to promote free drainage of liquid from the tap on closure of the valve head 6 against the seat 5.

Figure 2:
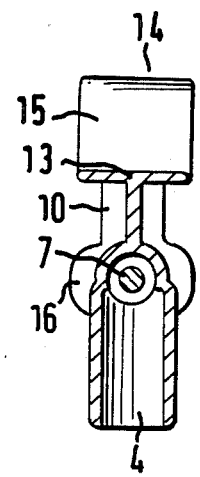
FIG. 2 is a cross-sectional view, on the line II—II of FIG. 1.
Figure 3:
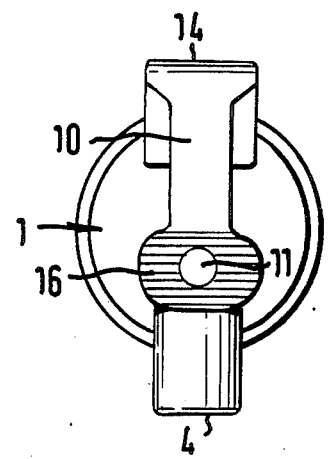
FIG. 3 is an end view in the direction III of FIG. 1.

In addition it will be noted that the means shown in FIG. 4 for securing the spring arm 10 to the stem 7 are different from the simple plug shown in FIGS. 1-3.

In the outer end of the thickened part 17 of the stem, slots are provided to be engaged by fingers 22 provided on the arm 10. The two parts are fitted together by sideways displacement of the free end of the arm 10 transversely to the axis of the valve stem 7 (i.e. in a direction out of the plane of the drawing of FIG. 4), alignment of the fingers and slots, and return of the free end of the arm to the axis of the valve stem 7 so that the fingers 22 may engage the slots. This construction has the advantage of reducing the number of parts required. Other securing means may be used.

The tap of FIG. 4 incorporates only one sealing vane; it is within the scope of the invention to provide more than one vane.

I claim:

1. A tap, for dispensing liquid from a vessel, the tap having a body to fit an outlet from the vessel, said body having a dispensing mouth and a seat for a valve housed in the body, said valve comprising a valve head and stem and being spring-loaded to close downstream against said seat and manually displaceable to open upstream, said stem extending downstream of said seat and passing as a sliding seal fit through a guide in the wall of said body, a valve-closing spring formed integrally with said body and engaged with said stem outside the path for flow of dispensed liquid, said body being moulded from plastics material, said spring comprising a resilient arm projecting from said body and engaged under stress and with said valve stem, said arm having an elbow forming a resilient hinge between said body and a free end of said arm engaged with said valve stem, said arm being an integral extension from a cross-flange of a T-flanged shoulder on said body, and part of said arm, extending laterally of said body from said flange to said elbow, providing a counter-surface, for engagement by fingers of a user's hand, facilitating manual depression of the free end of said arm engaged with said valve stem.

2. A tap as claimed in claim 1, in which a part of said valve stem passing through said guide has a seal comprising at least two grooves around said stem defining at least one integral vane between adjacent grooves, each said vane projecting outwardly from said stem to seal against said guide and being sufficiently thin to flex and allow sliding movement of said stem, the resilience of said vane tending to maintain the seal.

3. A tap as claimed in claim 2, in which the grooved part of said stem is thickened.

4. A tap as claimed in claim 3, in which said thickened part of said stem is slotted for engagement by said spring.

5. A tap, for dispensing liquid from a vessel, the tap having a body to fit an outlet from the vessel, said body having a dispensing mouth and a seat for a valve housed in the body, said valve comprising a valve head and stem and being spring-loaded to close downstream against said seat and manually displaceable to open upstream, said stem extending downstream of said seat and passing as a sliding seal fit through a guide in the wall of said body, a valve-closing spring formed integrally with said body and engaged with said stem outside the path for flow of dispensed liquid, said body being moulded from plastics material, said spring comprising a resilient arm projecting from said body and connected under stress with said valve stem, and said arm having an elbow forming a resilient hinge between said body and a free end of said arm connected with said valve stem, in which a part of said valve stem passing through said guide has a seal comprising at least two grooves around said stem defining at least one integral vane between adjacent grooves, each said vane extending completely around the periphery of the stem and projecting outwardly from said stem to seal against said guide and being sufficiently thin to flex and allow sliding movement of said stem, the resilience of said vane tending to maintain the seal.

6. A tap as claimed in claim 5, in which the grooved part of said stem is thickened.

7. A tap as claimed in claim 6, in which said thickened part of said stem is slotted for connected engagement by said spring.

8. A tap, for dispensing liquid from a vessel, the tap having a body to fit an outlet from the vessel, said body having a dispensing mouth and a seat for a valve housed in the body, said valve comprising a valve head and stem and being spring-loaded to close downstream against said seat and manually displaceable to open upstream, said stem extending downstream of said seat and passing as a sliding seal fit through a guide in the wall of said body, a valve-closing spring formed integrally with said body and engaged with said stem outside the path for flow of dispensed liquid, said body being moulded from plastics material, said spring comprising a resilient arm projecting from said body and connected under stress with said valve stem, and said arm having an elbow forming a resilient hinge between said body and a free end of said arm connected with said valve stem, wherein said arm is an integral extension from said body, part of said arm, extending laterally of said body to said elbow, providing a counter-surface engageable by fingers of a user's hand, facilitating manual depression of the free end of said arm connected with said valve stem.

9. A tap as claimed in claim 8 wherein the whole of said arm is manually accessible from the exterior of said body, and the elbow of said arm is the outermost projection from said body in the area of said body from which said arm projects.

10. A tap as claimed in claim 8 wherein the free end of said arm is connected with said valve stem so as to overlie and cover the outer end of said stem such that the free end of said arm forms the manually actuatable surface to displace said valve stem in the opening direction.

11. A tap as claimed in claim 8 wherein said elbow is disposed laterally outwardly such that it cannot be compressed between the valve body and any approaching part of the valve stem or any member moving with the valve stem.

* * * * *